United States Patent
Jin

(10) Patent No.: US 11,620,247 B2
(45) Date of Patent: Apr. 4, 2023

(54) CONVERSION ADAPTER AND CONVERSION ADAPTATION METHOD BETWEEN PCIE AND SPI REALIZED BASED ON FPGA

(71) Applicant: SHANGHAI NCATEST TECHNOLOGIES CO., LTD., Shanghai (CN)

(72) Inventor: Harry Jin, Shanghai (CN)

(73) Assignee: SHANGHAI NCATEST TECHNOLOGIES CO., LTD, Shanghai (CN)

( * ) Notice: Subject to any disclaimer, the term of this patent is extended or adjusted under 35 U.S.C. 154(b) by 0 days.

(21) Appl. No.: 17/426,189

(22) PCT Filed: Oct. 14, 2020

(86) PCT No.: PCT/CN2020/120843
§ 371 (c)(1),
(2) Date: Jul. 28, 2021

(87) PCT Pub. No.: WO2021/212769
PCT Pub. Date: Oct. 28, 2021

(65) Prior Publication Data
US 2023/0044188 A1 Feb. 9, 2023

(30) Foreign Application Priority Data
Apr. 22, 2020 (CN) .......................... 202010321657.3

(51) Int. Cl.
*G06F 13/20* (2006.01)
*G06F 13/38* (2006.01)
(Continued)

(52) U.S. Cl.
CPC .......... *G06F 13/385* (2013.01); *G06F 13/404* (2013.01); *G06F 13/4221* (2013.01); *G06F 13/4282* (2013.01)

(58) Field of Classification Search
None
See application file for complete search history.

(56) References Cited

U.S. PATENT DOCUMENTS

| | | | | |
|---|---|---|---|---|
| 6,553,439 B1* | 4/2003 | Greger | ................ | G06F 13/4291 |
| | | | | 710/39 |
| 2008/0307126 A1* | 12/2008 | Chou | ................... | G06F 13/4286 |
| | | | | 710/52 |

(Continued)

*Primary Examiner* — Henry Tsai
*Assistant Examiner* — Dean Phan
(74) *Attorney, Agent, or Firm* — Tianchen LLC.; Yuan R. Li; Yi Fan Yin

(57) ABSTRACT

An adaptation method between PCIE and SPI realized based on FPGA, comprising following steps: S01: a PCIE equipment sends PCIE information to a mapping module through a PCIE module; S02: the mapping module extracts SPI information from the PCIE information and transmits the SPI information to a SPI equipment through an SPI module; all of the PCIE module, the mapping module and the SPI module are located on a FPGA chip; S03: the SPI equipment performs a read/write operation according to the SPI information, and feeds back SPI operation information subjected to the read/write operation to the mapping module; S04: the mapping module modifies PCIE information according to the SPI operation information to obtain PCIE feedback information; S05: the PCIE equipment reads the PCIE feedback information through the PCIE module. The present invention provides a conversion adapter and a method between PCIE and SPI realized based on FPGA to realize conversion for a PCI interface and a SPI interface, so as to (Continued)

perform a read/write operation of an AD chip with the SPI interface or a DA chip with the SPI interface, which has universal applicability.

9 Claims, 1 Drawing Sheet

(51) Int. Cl.
*G06F 13/42* (2006.01)
*G06F 13/40* (2006.01)

(56) References Cited

U.S. PATENT DOCUMENTS

2010/0180067 A1* 7/2010 Garcia ................. G06F 13/387
711/E12.008
2020/0371828 A1* 11/2020 Chiou ................ G06F 9/45558

* cited by examiner

CONVERSION ADAPTER AND CONVERSION ADAPTATION METHOD BETWEEN PCIE AND SPI REALIZED BASED ON FPGA

CROSS-REFERENCE TO RELATED APPLICATION

This application claims priority of International Patent Application Serial No. PCT/CN2020/120843, filed Oct. 14, 2020, which is related to and claims priority of Chinese patent application Serial No. 202010321657.3 filed on Apr. 22, 2020. The entirety of each of the above-mentioned patent applications is hereby incorporated herein by reference and made a part of this specification.

TECHNICAL FIELD

The disclosure relates to the technical field of adapters, and particularly to a conversion adapter and a conversion adaptation method between PCIE and SPI realized based on a FPGA.

BACKGROUND

FPGA (Field-Programmable Gate Array) is a product of further development on a basis of programmable devices such as PAL (Programmable Array Logic), GAL (generic array logic), CPLD (Complex Programmable Logic Device), etc., and emerges as a semi-custom circuit in field of application-specific integrated circuits (ASIC), which not only solves shortcomings of custom circuits, but also overcomes shortcomings of limited number of gate circuits of traditional programmable devices.

PCI-Express (peripheral component interconnect express) is a high-speed serial computer extending bus standard with an original name of "3GIO", which was proposed by Intel in 2001 to replace an old bus standard of PCI, PCI-X and AGP. PCIe is a high-speed serial point-to-point dual-channel high-bandwidth transmission, each of devices connected is allocated with an exclusive channel bandwidth, which does not share bus bandwidth. It mainly supports active power management, error reporting, end-to-end reliable transmission, hot plugging and quality of service (QOS) and other functions. PCIe was renamed "PCI-Express", abbreviated as "PCI-e" after being certified and released by PCI-SIG (PCI Special Interest Organization). Its main advantage is a high data transmission rate and a considerable potential for development.

SPI is an abbreviation of Serial Peripheral Interface. SPI is a high-speed, full-duplex, and synchronous communication bus, which occupies only four wires on pins of a chip, so as to save the pins of the chip and save a space to provide a convenience for a PCB layout. Because of simplicity and easy-to-use, more and more chips adopt the communication protocol for SPI at present.

How to realize a conversion between a PCIE interface and a SPI interface, and complete a processing of reading and writing an AD chip with the SPI interface and a DA chip with the SPI interface are technical problems existing in the existing technology.

SUMMARY

The purpose of the present invention is to provide a conversion adapter and an adaptation method between PCIE and SPI realized based on FPGA to realize conversion for a PCI interface and a SPI interface, so as to perform read/write operations of an AD chip with the SPI interface or a DA chip with the SPI interface, which has universal applicability.

In order to achieve above objectives, the present invention adopts following technical solutions: a conversion adaptation method between PCIE and SPI realized based on FPGA, comprising following steps:

S01: a PCIE equipment sends PCIE information to a mapping module through a PCIE module;

S02: the mapping module extracts SPI information from the PCIE information and transmits the SPI information to a SPI equipment through an SPI module;

S03: the SPI equipment performs a read/write operation according to the SPI information, and feeds back SPI operation information subjected to the read/write operation to the mapping module;

S04: the mapping module modifies PCIE information according to the SPI operation information to obtain PCIE feedback information;

S05: the PCIE equipment reads the PCIE feedback information through the PCIE module.

Further, the PCIE information comprises an enable information, a completion information, an address information and a data information.

Further, the enable information comprises read/write enable information, the completion information comprises read/write completion information, and the address information comprises read/write address information, and the data information comprises read/write data information.

Further, the PCIE information comprises an address A and a corresponding X-bit data, an address B and a corresponding Y-bit data, both X and Y are integers greater than 0.

Further, the PCIE information comprises an address 0 and a corresponding 32-bit data, an address 1 and a corresponding 32-bit data.

Further, in step S02, read/write enable information, read/write address information and read/write data information are extracted from the PCIE information by the mapping module, and then transmitted to the SPI device through the SPI module.

Further, in step S04, the mapping module modifies completion information in the PCIE information according to the SPI operation information to obtain the PCIE feedback information.

A conversion adapter between PCIE and SPI realized based on FPGA, comprising an FPGA chip, which comprises a PCIE module, a mapping module and an SPI module, the PCIE module is connected to a PCIE device, the SPI module is connected to a SPI device, the mapping module is connected to both the PCIE module and the SPI module;

the PCIE device sends PCIE information to the mapping module through the PCIE module, the mapping module extracts SPI information from the PCIE information and transmits the SPI information to the SPI device through the SPI module, the SPI device performs a read/write operation according to the SPI information, and feeds back SPI operation information subjected to the read/write operation to the mapping module; the mapping module modifies the PCIE information according to the SPI operation information to obtain PCIE feedback information; and the PCIE device reads the PCIE feedback information through the PCIE module.

Further, the PCIE module comprises a PCIE interface, and the SPI module comprises an SPI interface.

The present invention has following beneficial effects: the present invention realizes conversion between a PCIE interface and a SPI interface, so as to perform a read/write operation of an AD chip with the SPI interface or a DA chip with the SPI interface, which has universal applicability. The present invention adopts the SPI interface with fewer signal lines, then protocol is simply and relative data rate is high, thus the conversion adapter of the present invention is flexible and convenient, which can be used to enhance interface stability and reduce costs; the present invention has advantages of reasonable design, simple structure, easy processing, small size, and convenient in use and multi-purpose, etc., which has a good promotion for use value.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Figure 1:
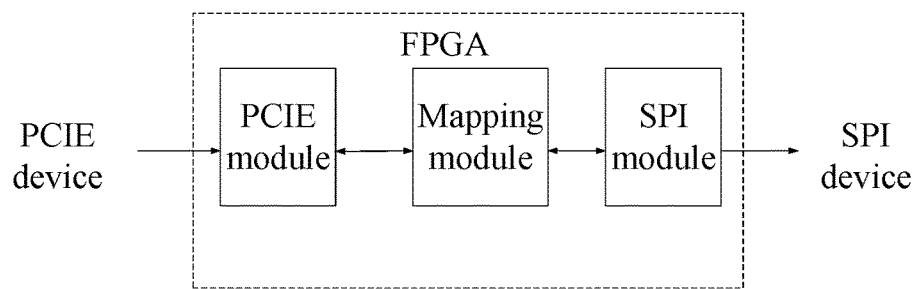
FIG. 1 is a frame diagram of a conversion adapter of the present invention.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

It is to be understood that "first," "second" and similar terms used in the specification and claims are not to represent any sequence, number or importance but only to distinguish different parts. Likewise, similar terms such as "a" or "an" also do not represent a number limit but represent "at least one". It is also to be understood that term "and/or" used in the present disclosure refers to and includes one or any or all possible combinations of multiple associated items that are listed.

In order to make the objectives, technical solutions, and advantages of the present invention clearer, the specific embodiments of the present invention will be further described in detail below with reference to the accompanying drawings.

As shown in FIG. 1, a conversion adapter between PCIE and SPI realized based on FPGA, comprising an FPGA chip, which comprises a PCIE module, a mapping module and an SPI module, the PCIE module is connected to a PCIE device, the SPI module is connected to a SPI device, the mapping module is connected to both the PCIE module and the SPI module; the PCIE device sends PCIE information to the mapping module through the PCIE module, the mapping module extracts SPI information from the PCIE information and transmits the SPI information to the SPI device through the SPI module, the SPI device performs a read/write operation according to the SPI information, and feeds back SPI operation information subjected to the read/write operation to the mapping module; the mapping module modifies the PCIE information according to the SPI operation information to obtain PCIE feedback information; and the PCIE device reads the PCIE feedback information through the PCIE module. The mapping module in the present invention is an address/data mapping module, that is, addresses and datum that need to be read/written can be extracted from the PCIE information.

An adaptation method between PCIE and SPI realized based on FPGA is provided by the present invention, which comprise following steps:

S01: a PCIE equipment sends PCIE information to a mapping module through a PCIE module; the PCIE information comprises enable information, completion information, address information and data information; wherein, the enable information comprises read/write enable information, the completion information comprises read/write completion information, and the address information comprises read/write address information, and the data information comprises read/write data information. The PCIE information comprises an address A and a corresponding X-bit data, an address B and a corresponding Y-bit data, both X and Y are integers greater than 0. For an example, the PCIE information comprises an address 0 and a corresponding 32-bit data, and an address 1 and a corresponding 32-bit data, both the corresponding 32-bit data corresponding to the address 0 and the corresponding 32-bit data corresponding to the address 1 comprise the read/write enable information, the read/write completion information, the read/write address information and the read/write data information; it is worth noting that the read/write completion information in the PCIE information is not the same as the read/write completion information in the PCIE feedback information. The read/write completion information in the PCIE information indicates an incomplete state, and the read/write completion information in the PCIE feedback information indicates a completed state. For an example, if a 31th bit number (Data[31]) of the address 1 is used to indicate whether writing is completed, a 30th bit number (Data[30]) of the address 1 indicates whether reading is completed, 0 is used to indicate the incomplete state and 1 is used to indicate the completed state, then both the 31th bit number (Data[31]) of the address 1 and the 30th bit number (Data[30]) of the address 1 in the PCIE information are 0, the 31th bit number (Data[31]) of the address 1 in the PCIE feedback information is 1, which indicates that a write operation is completed by the SPI device, and the 30th bit number (Data[30]) of the address 1 in the PCIE feedback information is 1, which indicates that a read operation is completed by the SPI device.

S02: the mapping module extracts SPI information from the PCIE information and transmits the SPI information to a SPI equipment through an SPI module; all of the PCIE module, the mapping module and the SPI module are located on a FPGA chip. Specifically, read/write enable information, read/write address information and read/write data information are extracted from the PCIE information by the mapping module, and then transmitted to the SPI device through the SPI module, and the read/write enable information, the read/write Address information and the read/write data information are comprised in data bits of the PCIE information, a value of a specific position of the data bits can be extracted to obtain the SPI information.

S03: the SPI equipment performs a read/write operation according to the SPI information, and feeds back SPI operation information subjected to the read/write operation to the mapping module. The SPI operation information is used to indicate whether the read operation or the write operation is completed by the SPI device.

S04: the mapping module modifies PCIE information according to the SPI operation information to obtain PCIE feedback information; specifically, the mapping module modifies completion information in the PCIE information according to the SPI operation information to obtain the PCIE feedback information. As described in step S01, change of date bits in a PCIE feedback module indicates the completion information, which is used to indicate whether the read operation or the write operation is completed by the SPI device.

S05: the PCIE equipment reads the PCIE feedback information through the PCIE module, a key point is to read the data bits in the PCIE feedback module, which indicates the completion information, so as to determine the read operation or the write operation is completed by the SPI device.

The present invention is further explained through embodiment 1:

Embodiment 1

A conversion adaptation method between PCIE and SPI realized based on FPGA, comprising following steps:

S01: a PCIE equipment sends PCIE information to a mapping module through a PCIE module; as shown in table 1 below, the PCIE information comprises an address 0 and a corresponding 32-bit data, and an address 1 and a corresponding 32-bit data, both the corresponding 32-bit data of the address 0 and the corresponding 32-bit data of the address 1 comprise read/write enable information, read/write completion information, read/write address information and read/write data information. Specifically, a 31th bit number (Data[31]) of the address 0 indicates whether to start a write operation, bit numbers from a 16th bit number to a 23th bit number (Data[23:16]) of the address 0 indicate an address of the write operation, that is, the bit numbers from the 16th bit number (Data[16]) to the 23th bit number (Data[23]) of the address 0 in the PCIE information are used to store the address of the write operation, bit numbers from a 15th bit number to a 0th bit number (Data[15:0]) of the address 0 indicate a data of the write operation, and a 31th bit number (Data[31]) of the address 1 indicates whether the write operation is completed. a 30th bit number (Data[30]) of the address 0 indicates whether to start the read operation, bit numbers from Data[23:16] of the address 0 indicate an address of the read operation, bit numbers from a 23th bit number to a 0th bit number (Data[23:0]) of the address 1 indicate a data of the read operation, a 30th bit number (Data[30]) of the address 1 indicates whether the read operation is completed. If both the Data[31] of the address 1 and the Data[30] of the address 1 are in the uncompleted state, both the Data[31] of the address 1 and the Data[30] of the address 1 can be expressed as 0.

S03: the SPI equipment performs a read/write operation according to the SPI information, and feeds back SPI operation information subjected to the read/write operation to the mapping module. The SPI operation information is used to indicate whether the read operation or the write operation is completed by the SPI device.

S04: the mapping module modifies the Data[31] or the Data[30] of the address 1 in the PCIE information according to the SPI operation information to obtain a PCIE feedback information by the mapping module. If the read operation is performed by the SPI device, the Data[30] of the address 1 changes from 0 to 1, and if the write operation is performed by the SPI device, the Data[31] bit of the address 1 changes from 0 to 1.

S05: the PCIE equipment reads the PCIE feedback information through the PCIE module, specifically, the Data[31] or the Data[30] of the address 1 can be read to determine whether the read operation or the write operation is completed by the SPI device.

The present invention realizes conversion between a PCIE interface and a SPI interface, so as to perform a read/write operation of an AD chip with the SPI interface or a DA chip with the SPI interface, which has universal applicability. The present invention adopts the SPI interface with fewer signal lines, then protocol is simply and relative data rate is high, thus the conversion adapter of the present invention is flexible and convenient, which can be used to enhance interface stability and reduce costs; the present invention has advantages of reasonable design, simple structure, easy processing, small size, and convenient in use and multipurpose, etc., which has a good promotion for use value.

The above descriptions are only the preferred embodiments of the present invention, and the described embodiments are not used to limit the scope of patent protection of the present invention. Therefore, any equivalent structural changes made using the contents of the description and drawings of the present invention should be included in the same reasoning. Within the protection scope of the appended claims of the present invention.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:
1. A conversion adaptation method between PCIE and SPI realized based on a FPGA, comprising following steps:

TABLE 1 a chart for a PCIE information

|  | Data [31] | Data [30] | ...... | Data [23:16] | Data [15:0] |
|---|---|---|---|---|---|
| Address 0 | 1b (write enable) | 1b (read enable) |  | 8b (read/write address) | 16b (write data) |
| Address 1 | 1b (write complete) | 1b (read complete) |  | 8b (read data) | 16b (read data) |

S02: the mapping module extracts SPI information from the PCIE information and transmits the SPI information to a SPI equipment through an SPI module. Specifically, the read/write enable information, the read/write address information and the read/write data information are extracted from the PCIE information by the mapping module, and then transmitted to the SPI device through the SPI module.

S01: a PCIE equipment sends PCIE information to a mapping module through a PCIE module;
S02: the mapping module extracts SPI information from the PCIE information and transmits the SPI information to a SPI equipment through an SPI module;
S03: the SPI equipment performs a read/write operation according to the SPI information, and feeds back SPI operation information subjected to the read/write operation to the mapping module;

S04: the mapping module modifies PCIE information according to the SPI operation information to obtain PCIE feedback information;

S05: the PCIE equipment reads the PCIE feedback information through the PCIE module.

2. The conversion adaptation method of claim 1, wherein the PCIE information comprises enable information, completion information, address information and data information.

3. The conversion adaptation method of claim 2, wherein the enable information comprises read/write enable information, the completion information comprises read/write completion information, and the address information comprises read/write address information, and the data information comprises read/write data information.

4. The conversion adaptation method of claim 2, wherein the PCIE information comprises an address A and a corresponding X-bit data, an address B and a corresponding Y-bit data, both X and Y are integers greater than 0.

5. The conversion adaptation method of claim 2, wherein the PCIE information comprises an address 0 and a corresponding 32-bit data, an address 1 and a corresponding 32-bit data.

6. The conversion adaptation method of claim 2, wherein in step S02, read/write enable information, read/write address information and read/write data information are extracted from the PCIE information by the mapping module, and then transmitted to the SPI device through the SPI module.

7. The adaptation method of claim 6, wherein in step S04, the mapping module modifies completion information in the PCIE information according to the SPI operation information to obtain the PCIE feedback information.

8. A conversion adapter between PCIE and SPI realized based on FPGA, comprising an FPGA chip, which comprises a PCIE module, a mapping module and an SPI module, the PCIE module is connected to a PCIE device, the SPI module is connected to a SPI device, the mapping module is connected to both the PCIE module and the SPI module;

the PCIE device sends PCIE information to the mapping module through the PCIE module, the mapping module extracts SPI information from the PCIE information and transmits the SPI information to the SPI device through the SPI module, the SPI device performs a read/write operation according to the SPI information, and feeds back SPI operation information subjected to the read/write operation to the mapping module; the mapping module modifies the PCIE information according to the SPI operation information to obtain PCIE feedback information; and the PCIE device reads the PCIE feedback information through the PCIE module.

9. The conversion adapter of claim 8, wherein the PCIE module comprises a PCIE interface, and the SPI module comprises an SPI interface.

* * * * *